United States Patent
Tsai et al.

[11] Patent Number: 5,971,347
[45] Date of Patent: Oct. 26, 1999

[54] VIBRATION DAMPER

[76] Inventors: Chong-Shien Tsai, 76 Summerview Rd., Williamsville, N.Y. 14221; Lap Lai Chung, Fl. 4 No. 23-2, Wen Hua Third Road, Pei Tou, Taipei City, Taiwan

[21] Appl. No.: 09/103,557

[22] Filed: Jun. 24, 1998

[51] Int. Cl.$^6$ .................................................. F16M 13/00
[52] U.S. Cl. ........................... 248/618; 248/638; 52/167.1
[58] Field of Search ................................. 248/618, 638, 248/636, 566, 622, 644, 550, 542; 52/167.1, 167.3, 167.6, 167.7, 167.8

[56] References Cited

U.S. PATENT DOCUMENTS

| | | | |
|---|---|---|---|
| 846,249 | 3/1907 | Seiler | 52/167.6 |
| 2,014,643 | 9/1935 | Bakker | 324/219 |
| 2,359,915 | 10/1944 | Hussman | 267/135 |
| 3,390,854 | 7/1968 | Sherburne | 248/55 |
| 3,606,704 | 9/1971 | Denton | 52/167.8 |
| 3,952,980 | 4/1976 | Von Pragenau et al. | 248/22 |
| 4,117,637 | 10/1978 | Robinson | 52/167 |
| 4,187,573 | 2/1980 | Fyfe et al. | 14/16.1 |
| 4,230,291 | 10/1980 | Marshall, II | 244/17.11 |
| 4,499,694 | 2/1985 | Buckle et al. | 52/167 |
| 4,565,039 | 1/1986 | Oguro et al. | 52/167 |
| 4,605,106 | 8/1986 | Fyfe et al. | 188/374 |
| 4,620,688 | 11/1986 | Khlafallah et al. | 248/542 |
| 4,651,481 | 3/1987 | Csak | 52/167 |
| 4,722,505 | 2/1988 | Kaiser | 248/561 |
| 4,731,966 | 3/1988 | Fujita et al. | 52/167 |
| 4,766,708 | 8/1988 | Sing | 52/167 |
| 4,823,522 | 4/1989 | White | 52/167 |
| 4,864,785 | 9/1989 | Schneider | 52/167 |
| 5,065,555 | 11/1991 | Kobori et al. | 52/167 DF |
| 5,067,684 | 11/1991 | Garnjost | 248/550 |
| 5,249,784 | 10/1993 | Murakami et al. | 267/219 |
| 5,692,728 | 12/1997 | Shiozawa | 248/618 |

*Primary Examiner*—Leslie A. Braun
*Assistant Examiner*—Tan Le
*Attorney, Agent, or Firm*—Rosenberg, Klein & Bilker

[57] ABSTRACT

A disturbance-proof device connected between two vertically spaced beams for absorbing shocks upon a disturbance, includes a flat top plate, a flat bottom plate, and a plurality of flat supporting plate connected in parallel between the flat top plate and the flat bottom plate, each flat supporting plate having a substantially V-shaped profile with its width gradually reducing from the flat top plate toward the flat bottom plate, a flat top flange welded to the flat top plate, and a round rod at its bottom side inserted in between two parallel locating blocks raised from the bottom plate.

9 Claims, 5 Drawing Sheets

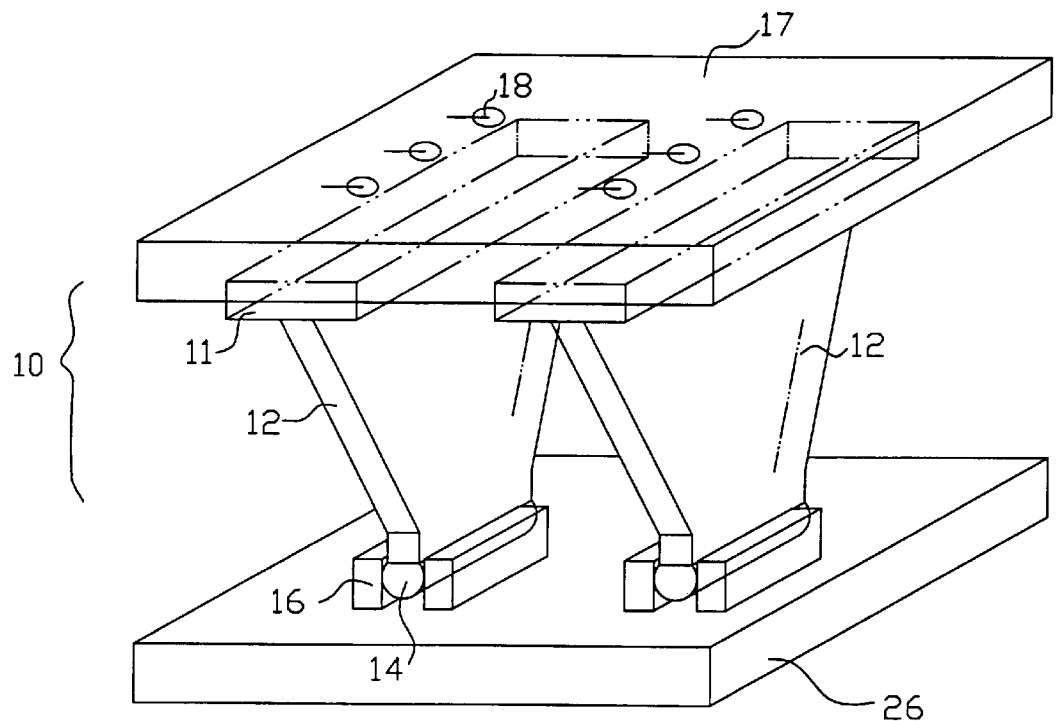
FIG.1
FIG.2
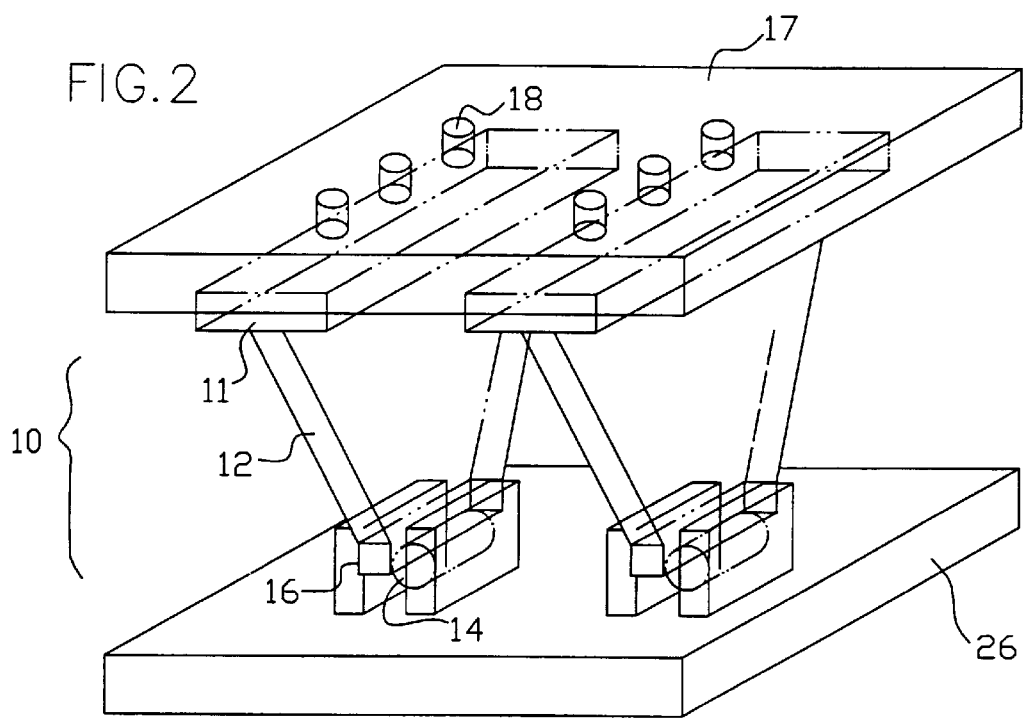

VIBRATION DAMPER

BACKGROUND OF THE INVENTION

1. Field of the Invention

The present invention relates to a disturbance-proof device for frames, and more particularly to such a disturbance-proof device designed for connection between two vertically spaced beams for absorbing shocks upon a disturbance.

2. Description of the Prior Art

It is inevitable that a frame will be subjected to disturbances in its serving life. Although there have been many improvements in materials and manufacturing techniques, the disturbance-proof design of a frame still remains impractical without advanced development.

The conventional disturbance resistant design of a frame adopts the concept of its material features to resist disturbances. However, damage to frames still results due to a large deformation of members in frames caused by disturbances.

Frames in certain areas where disturbances tend to occur must be specially designed so that vibration energy induced by disturbances can be absorbed or lessened and that the functions of frames can be ensured. Therefore, the present invention is developed to absorb the disturbance-induced energy and to increase the vibration resistibility of frames.

SUMMARY OF THE INVENTION

This invention is directed to a disturbance-proof device for frames designed for connection between two vertically spaced beams for absorbing shocks upon a disturbance.

According to one embodiment of the present invention, the disturbance-proof device is designed for connection between two vertically spaced beams for absorbing shocks upon a disturbance, comprising a flat top plate, a flat bottom plate, and a plurality of flat supporting plate connected in parallel between the flat top plate and the flat bottom plate, each flat supporting plate having a substantially V-shaped profile with its width gradually reducing from the flat top plate toward the flat bottom plate, a flat top flange welded to the flat top plate, and a round rod at its bottom side inserted in between two parallel locating blocks raised from the bottom plate. According to another embodiment of the present invention, each flat supporting plate has a substantially X-shaped profile with its width gradually increasing from a middle part thereof toward the flat top plate and the flat bottom plate in reversed directions.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a perspective view of a disturbance-proof device for frames according to a first embodiment of the present invention.

FIG. 2 is a perspective view of a disturbance-proof device for frames according to a second embodiment of the present invention.

DETAILED DESCRIPTION OF THE PREFERRED EMBODIMENT

Figure 3:
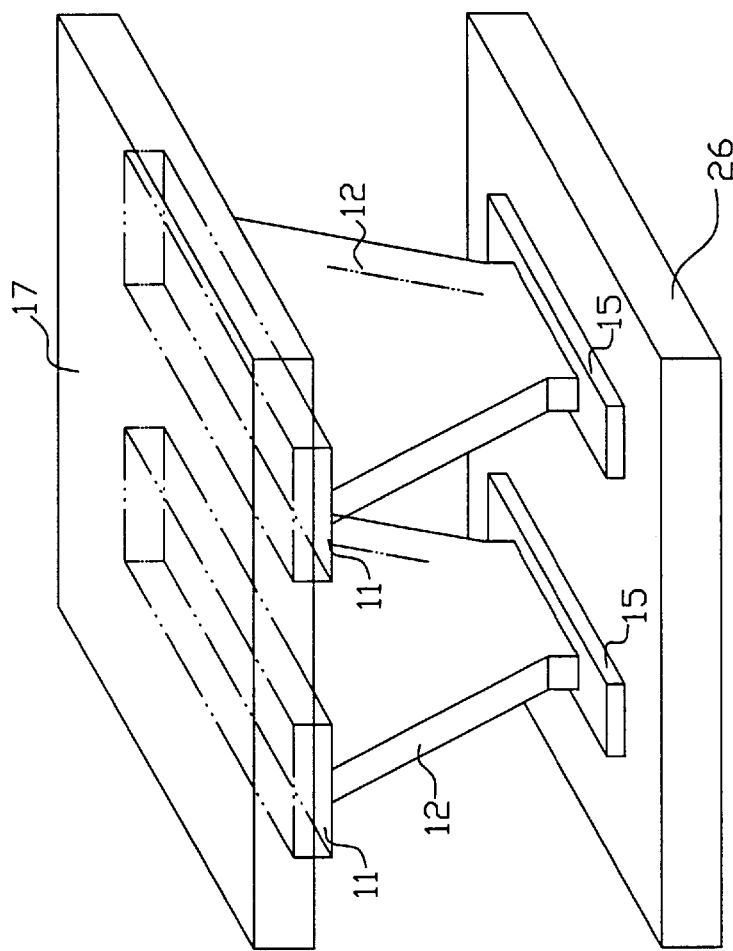
FIG. 3 is a perspective view of a disturbance-proof device for frames according to a third embodiment of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Referring to FIG. 1, a disturbance-proof device 10 is shown comprised of a flat bottom plate 26, a flat top plate 17, and a plurality of flat supporting plates 12 vertically connected in parallel between the flat top plate 17 and the flat bottom plate 26. The flat bottom plate 26 comprises pairs of parallel locating blocks 16 respectively raised from its top side. The flat supporting plates 12 are made from profiled T-section or I-section steel (or other metal). Each flat supporting plate 12 has a substantially V-shaped profile, a steel round rod 14 fixedly disposed at its bottom side and retained in one pair of locating blocks 16, a horizontal top flange 11 at its top side welded to the bottom side of the flat top plate 17. The flat top plate 17 has transverse rows of through holes 18 corresponding to the horizontal top flanges 11 of the flat supporting plates 12. Through the through holes 18, the horizontal top flanges 11 of the flat supporting plates 12 are welded to the flat top plate 17.

Figure 8:
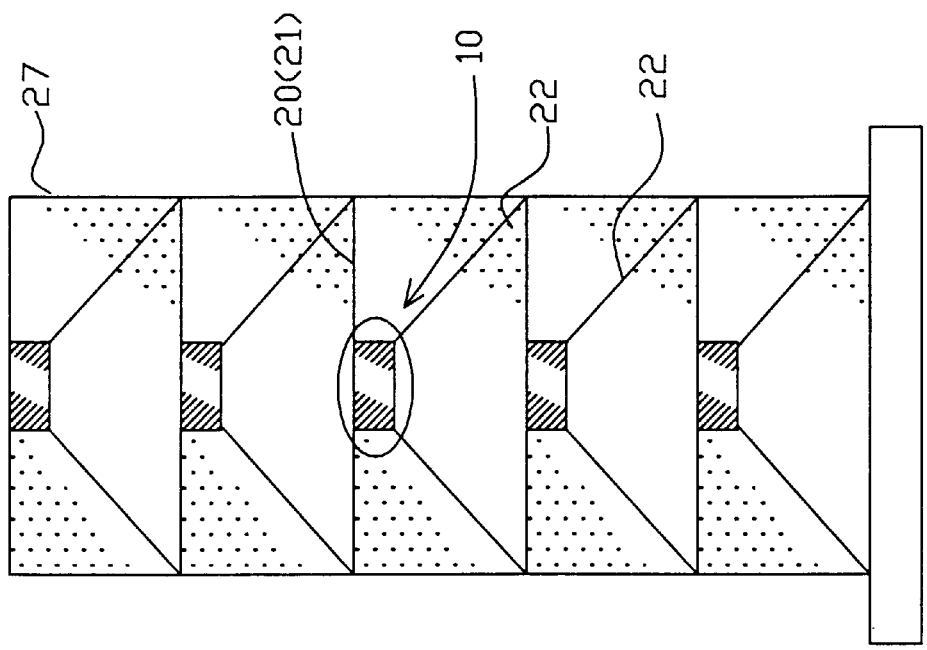
FIG. 8 shows an application example of the present invention.
Figure 9:
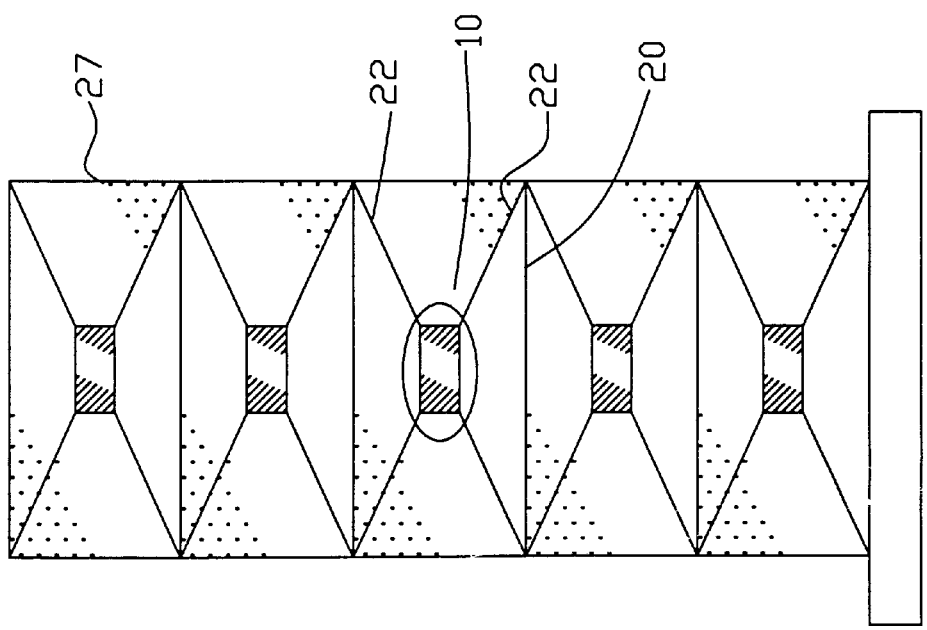
FIG. 9 shows another application example of the present invention.

Referring to FIG. 8 and FIG. 1 again, a plurality of vertically spaced beams 20 are connected in parallel between two columns 27, and a plurality of disturbance-proof devices 10 are respectively connected between each two adjacent beams 20. The flat top plate 17 of each disturbance-proof device 10 is bounded to an upper beam 20, and the flat bottom plate 26 of each disturbance-proof device 10 is connected to bracings 22 which are in turn connected to a lower beam 20 or the columns 27 by bracings 22. Upon a disturbance, the round rods 14 are moved with the respective flat supporting plates 12 in the respective pairs of parallel locating blocks 16 to absorb or lessen shocks. Alternatively, the flat top plate 17 and bottom plate 26 of each disturbance-proof device 10 may be respectively connected between two vertically spaced beams 20 by respective bracings 22 (see FIG. 9).

Referring to FIG. 2, the round rod 14 is relatively shorter than the length of the bottom side of the corresponding flat supporting plate 12, having a longitudinal groove (not shown) at the periphery along its length adapted to receive the bottom edge of the corresponding flat supporting plate 12.

Figure 4:
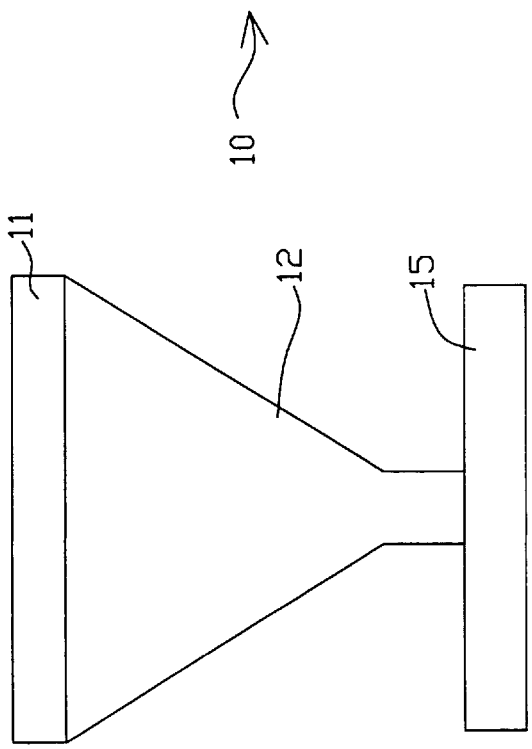
FIG. 4 is a side plain view of a flat supporting plate for the third embodiment of the present invention.

Referring to FIGS. 3 and 4, the flat supporting plate 12 is made from a profiled I-section steel, having a horizontal bottom flange 15 and a horizontal top flange 11; the horizontal bottom flange 15 of each flat supporting plate 12 is directly welded to the flat bottom plate 26; the flat top plate 17 is supported on the horizontal top flange 11 of each flat supporting plate 12.

Figure 5:
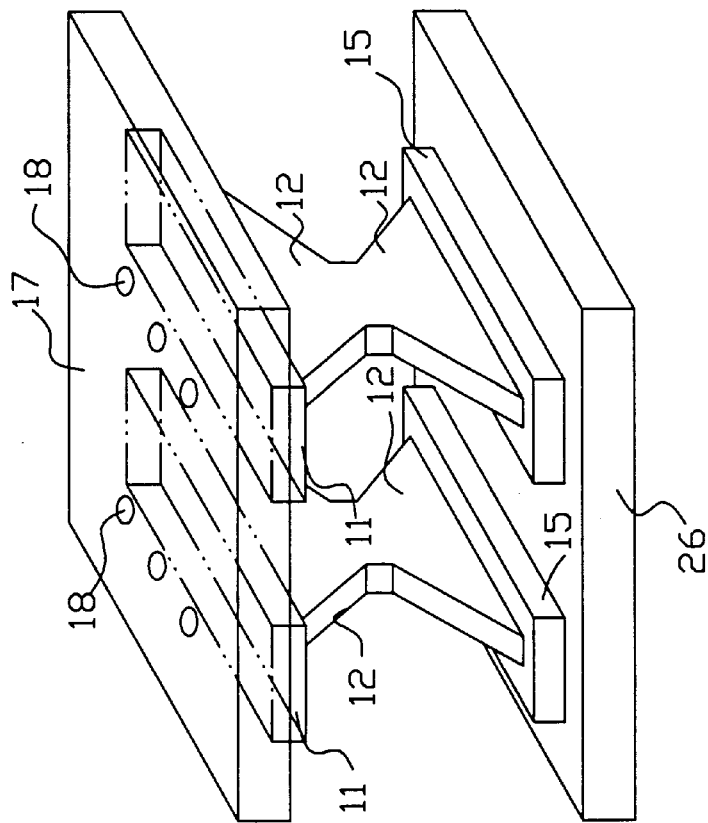
FIG. 5 is a perspective view of a disturbance-proof device for frames according to a fourth embodiment of the present invention.
Figure 6:
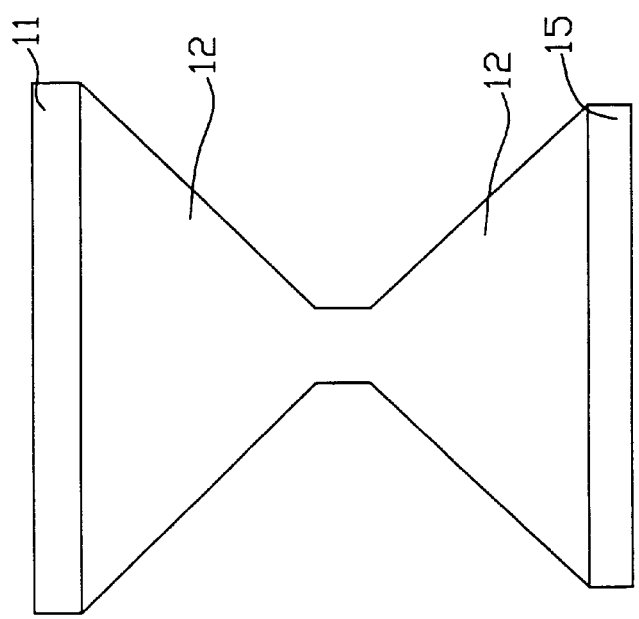
FIG. 6 is a side plain view of a flat supporting plate for the fourth embodiment of the present invention.

Referring to FIGS. 5 and 6, the flat supporting plate 12 is made from profiled I-section steel, having a substantially X-shaped profile, a flat top flange 11 welded to the flat top plate 17, and a flat bottom flange 15 welded to the flat bottom plate 26.

Figure 7:
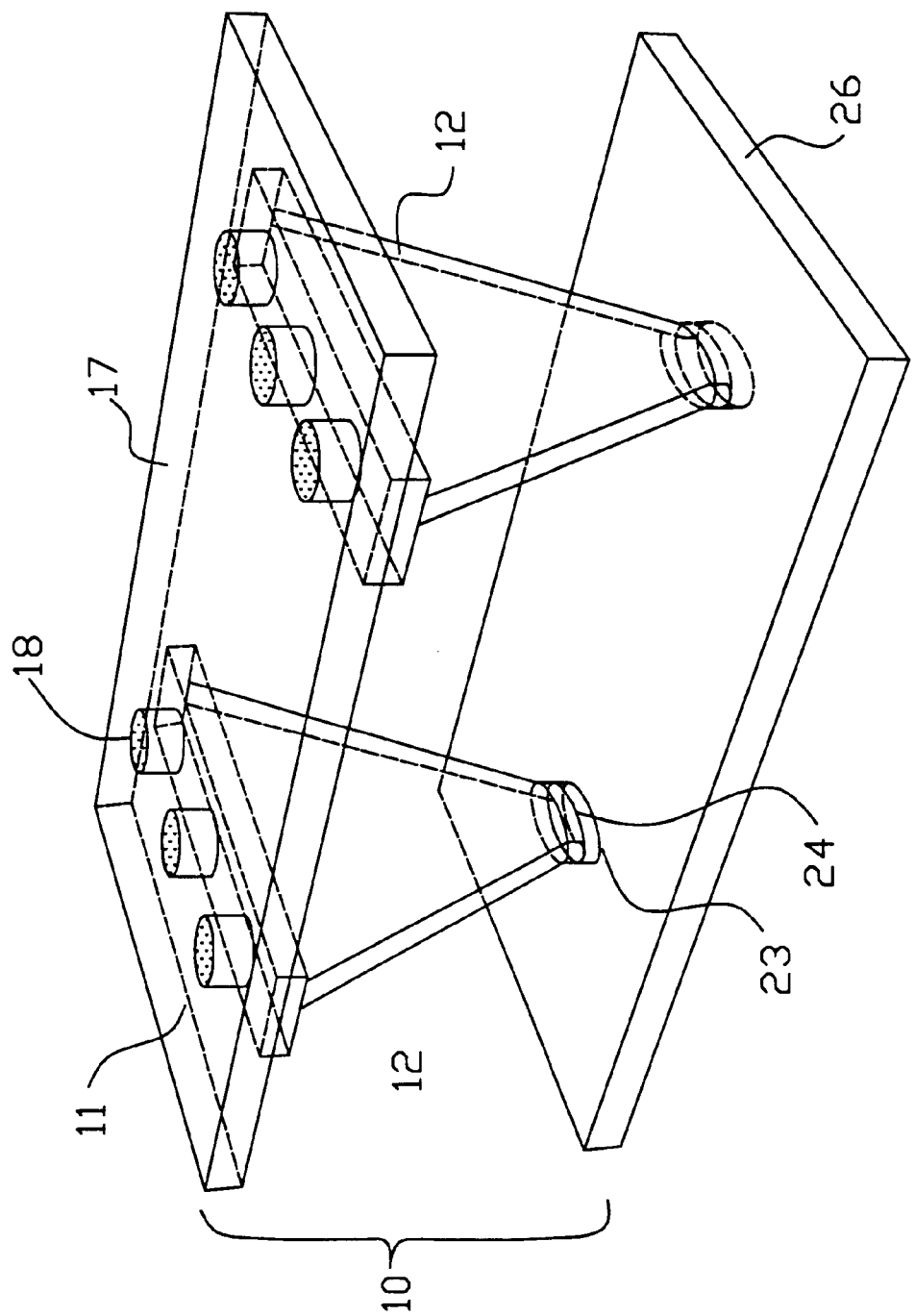
FIG. 7 is a perspective view of a disturbance-proof device for frames according to a fifth embodiment of the present invention.

Referring to FIG. 7, the flat supporting plate 12 has a bottom side inserted into a hole 23 on the flat bottom plate 26 and supported on a ball 24.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A disturbance-proof device for connection between two vertically spaced beams to absorb shocks of a disturbance, comprising a flat top plate, a flat bottom plate, and a plurality of flat supporting plates connected in parallel between said flat top plate and said flat bottom plate, wherein each of said flat supporting plates has a substantially V-shaped profile with its width gradually reducing from said flat top plate toward said flat bottom plate for absorbing shocks from a disturbance, said flat top and said flat bottom plate are respectively for connecting to the two vertically spaced beams by respective bracings, said flat top plate being adapted to be fastened to an upper beam by a process selected from welding or bolting, and said flat bottom plate is adapted to be supported on a lower beam by bracings.

2. The disturbance-proof device of claim 1, wherein each of said flat supporting plates has a flat top flange and a flat bottom flange respectively connected to said flat top plate and said flat bottom plate.

3. The disturbance-proof device of claim 1, wherein said flat top plate has transverse rows of through holes corresponding to said flat supporting plates for welding said flat supporting plates thereto.

4. The disturbance-proof device of claim 1, wherein each of said flat supporting plates has a bottom side welded to a round rod, said round rod being inserted between two parallel locating blocks raised from said flat bottom plate.

5. The disturbance-proof device of claim 4, wherein said round rod has a longitudinal groove for receiving said bottom side of the corresponding flat supporting plate.

6. The disturbance-proof device of claim 1, wherein each of said flat supporting plates has a bottom side welded with a ball and inserted into a respective locating hole formed in said flat bottom plate.

7. The disturbance-proof device of claim 1, wherein each of said flat supporting plates is formed from profiled T-section metal.

8. The disturbance-proof device of claim 1, wherein each of said flat supporting plates are formed from profiled I-section metal.

9. A disturbance-proof device for connection between two vertically spaced beams to absorb shocks from a disturbance, comprising a flat top plate, a flat bottom plate, and a plurality of flat supporting plates connected in parallel between said flat top plate and said flat bottom plate, wherein each of said flat supporting plates is made from profiled I-section metal and has a substantially X-shaped profile with its width gradually increasing from a middle part thereof toward said flat top plate and said flat bottom plate in reversed directions for absorbing shocks from a disturbance, and said flat top plate and said flat bottom plate are respectively for connecting between said two vertically spaced beams by respective bracing.

* * * * *